Patented Feb. 25, 1947

2,416,404

UNITED STATES PATENT OFFICE 2,416,404

PROCESS AND APPARATUS FOR ADIABATIC FRACTIONATION

Wayne A. Proell, Chicago, Ill., assignor to Standard Oil Company, Chicago, Ill., a corporation of Indiana Application August 23, 1943, Serial No. 499,649

5 Claims. (Cl. 196—94)

This invention relates to a process and apparatus for fractionation and more particularly relates to a fractionation system having automatic means for maintaining adiabatic conditions to effect the separation of otherwise difficulty separable mixtures. The invention is particularly useful in the removal of traces of undesirable components of widely different boiling point from a given material or in the separation of components from a mixture wherein the boiling points of the several components are so close as to preclude efficient separation by conventional means.

An object of this invention is to provide a process and apparatus whereby a substantially adiabatic fractionation is effected. A further object is to provide a process and apparatus wherein a portion of the charge is utilized to maintain the system under substantially adiabatic conditions. Another object is to provide a method and means whereby a more efficient fractionation is possible while obtaining a heat economy. Still another object of my invention is to provide a system whereby increased efficiency in the separation of narrow boiling cuts is obtained. It is also an object of my invention to provide a wholly automatic system which provides a jacket of flowing vapor having substantially the same composition as the desired product. Another object is to provide a method and means for the easy elimination of non-condensible gases. An additional object is to provide a method and means for adiabatic fractionation wherein smaller amounts of reflux are needed. These and other objects will become apparent as the description of my invention proceeds.

Figure 1:
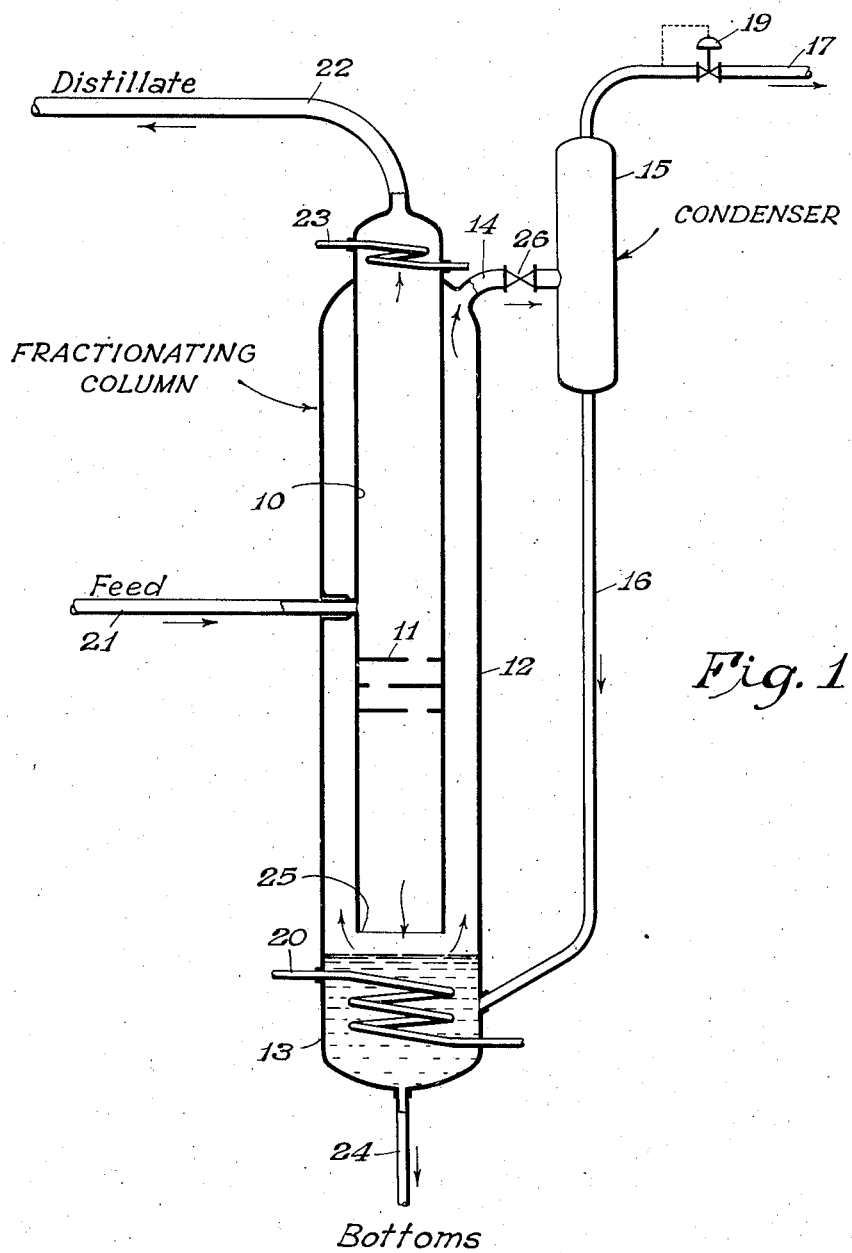

Referring to Figure 1 of the drawings, the apparatus is made up of an inner column 10 which is a conventional fractionating column containing either bubble trays or other suitable packing 11 preferably made of a heat conducting material, such as wire gauze. The inner fractionating column 10 is jacketed by the outer shell 12, the bottom 25 of column 10 and the outer shell 12 communicating with a common or joint liquid reservoir 13. The shell 12 is closed to the atmosphere and the overhead therefrom is conducted by valved line 14 into a condenser or reflux drum 15 which is provided with the conventional cooling coils (not shown) through which may be passed a suitable cooling medium, a vent 17 and condensate return line 16. A control valve 26 on line 14 regulates the vapor flow through the vapor jacket or shell 12 about the column 10. Valve 26 may be manually set to discharge a measured volume of vapor per hour to condenser 15, or it may be thermally controlled by a suitable thermostat to open only when the temperature falls below a selected temperature. Likewise means can be provided for controlling the valve 26 in response to the pressure existing within the shell 12. In general, the valve 26 will be set at a small constant discharge rate with the object of preventing light ends accumulating in shell 12. Valve 19 as illustrated is pressure controlled to vent freely all noncondensible gases from the system and is provided with adjustable means, such as spring loading, to permit operation at any desired pressure ranging from atmospheric to superatmospheric. When the operation is under superatmospheric pressure, noncondensibles accumulated in the condenser are vented by valve 19 at the selected operating pressure. This valve can be thermostatically controlled to vent cold gases.

In the lower portion of the shell 12 a heating element 20 is immersed in the reservoir of liquid. This heating element is illustrated as a pipe coil supplied with a heating fluid, but it should be understood that the liquid may be withdrawn from the reservoir 13 and passed through a reboiler and reintroduced into the shell 12 at a point below the bottom of column 10. Conduit means 21 is provided for introducing a feed into the column 10 and overhead conduit 22 communicates with column 10 for withdrawing the desired distillate. A cooling coil 23 to provide reflux is disposed in the top of column 10. A bottom drawoff 24 is provided for the reservoir 13 which forms the bottom of the shell 12 and communicates directly with the open bottom 25 of the column 10.

In operation, the hot feed enters through conduit 21, the lighter constituents of the vapor ascending through column 10 and undergoing fractionation therein. The heavier constituents pass downwardly through the column 10 and are accumulated as bottoms in reservoir 13. Simultaneously heat is supplied to reservoir 13 and vapors therefrom ascend the shell or jacket 12 and provide an insulating envelope of vapor about the column 10 at a temperature substantially equal to that within the column 10. Concurrently a portion of the vapors enters the column 10 through the open bottom 25. By suitable throttling of valve 26, manually or automatically, controlled amounts of the vapor are continually removed from the shell 12 and condensed to keep the space between the column 10 and the shell 12 completely filled with vapor. Any condensible light ends accumulated in the upper portion of the shell 12 are withdrawn overhead, recovered in 15 and recycled by line 16 thus giving the light ends another opportunity to enter column 10 and to be recovered as a part of the desired product withdrawn by line 22. Any non-condensible gases pass the condenser and vent through valve 19.

Thus the column 10 suffers no heat loss and, in fact, a slight heat influx can be accomplished by controlling the amount of reflux introduced into the column 10 and/or the amount of condensation occurring in shell 12. For example, the amount of reflux, the rate of vapor withdrawal from the shell 12 and the amount of heat introduced by reboiler means 20 can be so correlated that there is substantially no condensation of the vapor on the wall of column 10, but that sufficient additional heat is supplied by the reboiler to compensate for the normal heat loss to the atmosphere by the condensation of a portion of the vapor upon shell 12. Thus an adiabatic temperature control is provided when the cut being fractionated has a narrow boiling range or contains traces of heavier contaminants. The vapor from shell 12 passes through valve 26 in line 14 and the heavier constituents are liquefied in condenser 15. The valve 19 is used as a pressure control for the system and as a vent valve for the non-condensible gases withdrawn from the condenser 15. The liquid from condenser 15 is recycled by line 16 to the reservoir 13 in the bottom of shell 12.

It will be apparent that the narrower the cut being fractionated, the more efficient the column will be since its overall temperature then approaches a constant and approaches perfect adiabaticity. Consequently my invention is particularly adapted to the fractionation of such mixtures as isomeric butene, heptane-toluene, and toluene-xylene mixtures, and the like. In view of its adiabatic nature the column is well adapted to the use of highly efficient packings of low flooding capacity, such as the type wherein wire gauze cones are disposed apex to apex and base to base with larger openings being provided for the upward passage of vapor in contact with the capillary film of reflux liquid which is supported by the wire gauze.

For the lighter petroleum products, such as gasoline constituents, esters, pure hydrocarbons and the like, more efficient fractionation is desirable. Small scale fractionating columns are useful as analytical apparatus and in the design and operation of large scale equipment. In small scale operations, however, heat losses usually render the fractionation far from adiabatic. My invention is particularly useful in eliminating heat losses from this type of column to attain the desired fractionation control but it is contemplated that it can be applied to full plant scale operation.

Figure 2:
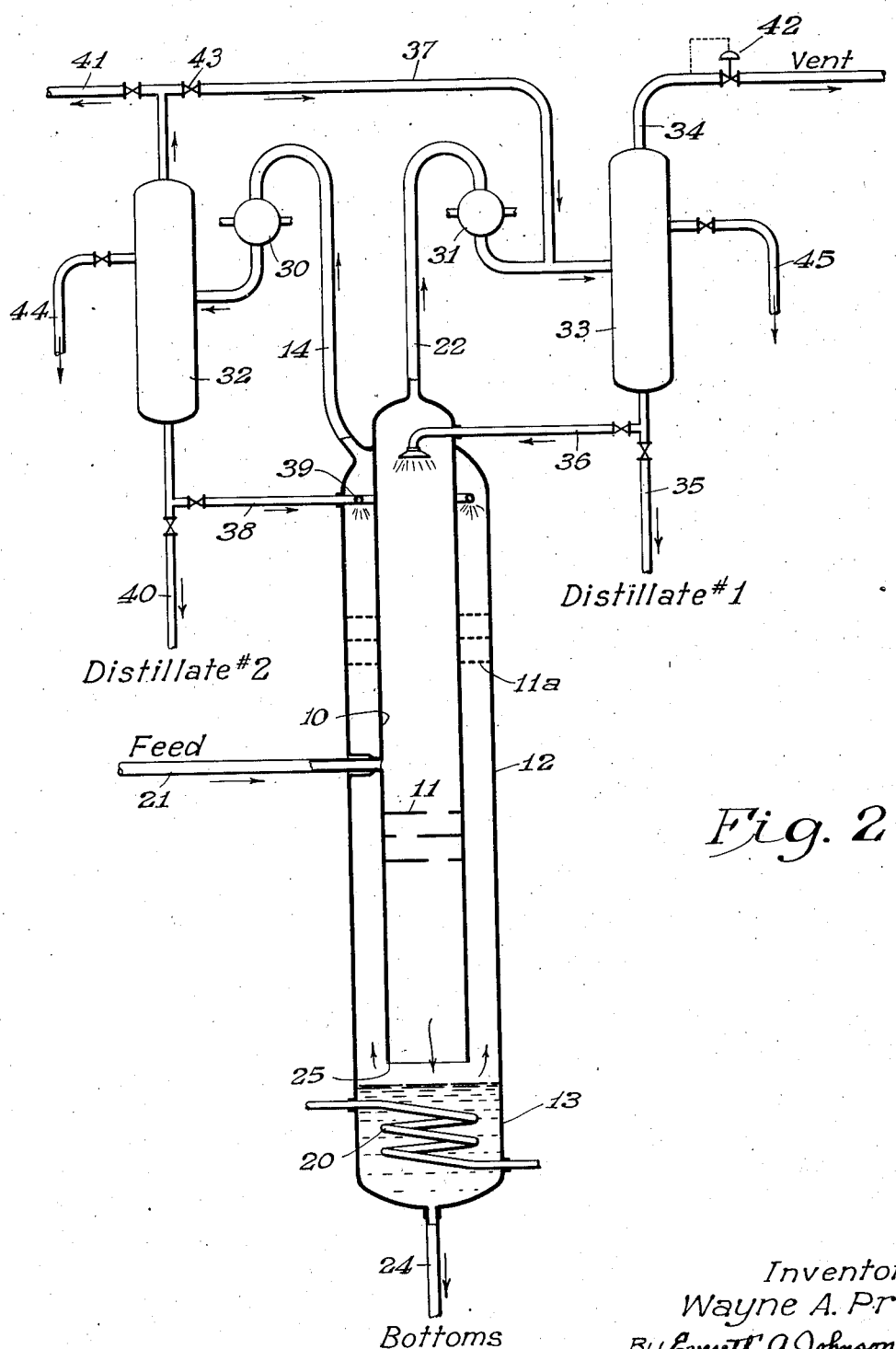

Figure 2 illustrates another embodiment of the invention wherein the elements corresponding to those of Figure 1 are identified by similar reference characters. Thus an inner column 10 and an outer shell 12 are provided and have packing 11 and 11a similar to that proposed for Figure 1. The inner fractionating column 10 is surrounded by the outer or annular fractionating tower 12, the bottom of column 10 and the annular tower 12 communicating with a common or joint liquid reservoir 13. Conduit means 21 is provided for introducing a vapor feed into the column 10 and overhead conduit 22 communicates with column 10 for withdrawing a desired distillate. The overhead from annular fractionating tower 12 is conducted therefrom by line 14. In the lower portion of the apparatus reservoir 13 is provided with a heating element 20 immersed in the pool of liquid. A bottom drawoff 24 is provided for the reservoir 13 which forms the bottom of the annular fractionating column 12 and communicates directly with the open bottom 25 of the column 10. The overhead from each of the fractionating zones is withdrawn by lines 14 and 22, passed through coolers 30 and 31, and introduced into reflux drums 32 and 33, respectively. Reflux drum 33 is provided with a vent line 34 having valve 42 which may be used to control the pressure of the system and to vent the non-condensible gases from the condenser 33. A portion of the liquid from condenser 33 can be withdrawn as a desired distillate by line 35 and another portion returned by line 36 to column 10 as reflux. Alternatively the column 10 may be provided with a cooling coil near its top to provide the necessary reflux liquid. The overhead from shell 12 is withdrawn through line 14, cooler 30 and introduced to reflux drum 32. The overhead from reflux drum 32 is withdrawn by valved line 37 and introduced into condenser 33, for example by line 22 or valve 43 in line 37 may be closed and non-condensible gases may be vented from drum 32 via valved vent 41. A portion of the liquid from reflux drum 32 is introduced by line 38 and distributor 39 as reflux for fractionating tower 12. Another portion of the liquid may be withdrawn by line 40 as a desired distillate.

In operation of the apparatus illustrated in Figure 2 the hot mixed feed vapors enter through conduit 21, the lighter constituents of the vapors ascending through the column 10 and undergoing fractionation therein. The heavier constituents pass downwardly through the column 10 and are accumulated as bottoms in reservoir 13. Simultaneously heat is supplied to the reservoir 13 and vaporized hydrocarbons ascend the annular fractionating tower 12 thereby providing an insulating envelope about the column 10. Concurrently a portion of the vapors enters the column 10 through the open bottom 25. One fraction is recovered by line 35 and another by line 40, drawoffs 44 and 45 being closed in this operation. By controlling the relative rates of reflux supplied to column 10 and the shell 12 by line 36 or 38, along with the heat input to reservoir 13 a unique and efficient fractionating system is provided. The fractionating column 10 is substantially adiabatic and the product recovered therefrom will be substantially free of any contaminants which comprise either traces of high boiling materials or hydrocarbons which have boiling points approaching that of the desired distillate. Thus I may fractionate in one operation a whole naphtha to obtain a light naphtha and a heavy naphtha with the removal of the heavy color producing bodies. Likewise mixtures of toluene, xylene and normal heptane can be separated to produce substantially pure toluene. When the light constituent is to be substantially pure the mix is introduced by line 21 as shown. When the heavier constituent is to be recovered the mix is introduced directly into shell 12.

The apparatus of Figure 2 also may be modified and employed in the separation and recovery of azeotropic mixtures. Thus an aromatic-paraffin mixture with an azeotropic agent can be introduced by line 21, drums 32 and 33 operated as separators, paraffins recovered by drawoff lines 44 and/or 45, aromatics at 24, and the agent recycled as reflux by lines 36 and 38.

From the above it will apparent that I have attained the objects of my invention and have provided method and means for a novel and efficient fractionation. Although I have described the process and apparatus with particular reference to certain embodiments thereof, it should be understood that this is by way of illustration only and not by way of limitation, and that the invention is set forth in the appended claims.

I claim:

1. Apparatus for fractionating a narrow boiling mixture comprising an inner fractionating column, means for introducing said mixture into said column, a shell substantially surrounding said column, means for accumulating a pool of liquid in the lower portion of said shell, the bottom of said fractionating column having direct vapor communication with the vapor space above said pool, means for supplying heat to the liquid in said pool, valve means responsive to conditions within the shell for controllably withdrawing vapor from said shell at a high point therein, means for condensing said vapors exterior of said shell, means for returning at least a portion of said condensate to said pool, means for withdrawing from said column a selected component of said mixture, and means for withdrawing a second component from said shell.

2. The apparatus of claim 1 wherein said valve means is controlled by the pressure within the shell.

3. The apparatus of claim 1 which includes a vent from said means for condensing vapors, said vent comprising a valve thermostatically controlled by the temperature of the non-condensible gases therein.

4. Fractionating apparatus comprising an inner fractionating column, a shell substantially surrounding said column, means for accumulating a pool of liquid below said fractionating column and shell, said shell and said fractionating column being in direct vapor communication with the vapor space above said pool, means for withdrawing vapor from said shell at a high point therein, condenser means exterior of said shell and fractionating column for condensing at least a portion of said vapors withdrawn from said shell, means for maintaining a vapor pressure head on said condenser, means for venting uncondensable gases from said condenser means, a conduit directly connecting said condenser means to said pool-accumulating means for returning condensate from said condenser means to said pool, and means for withdrawing a selected component from a high point in said column.

5. Apparatus for fractionating a narrow boiling mixture comprising an inner fractionating column, a conduit means for introducing said narrow boiling mixture into said fractionating column at an intermediate point, a shell substantially surrounding said column, means for accumulating a pool of liquid in the lower portion of said shell, the lower end of said fractionating column being in direct vapor communication with the vapor space above said pool, means for supplying heat to the liquid in said pool, means for controllably withdrawing vapor from said shell at a high point therein, means for condensing at least a portion of said withdrawn vapors exterior of said shell, a conduit directly connecting said condensing means to said pool-accumulating means for returning condensate from said condensing means to said pool, means for withdrawing from said condensing means an uncondensed vapor fraction, and means for withdrawing from a high point in said column a selected component of said mixture.

WAYNE A. PROELL.

REFERENCES CITED

The following references are of record in the file of this patent:

UNITED STATES PATENTS

| Number | Name | Date |
|---|---|---|
| 2,281,906 | Adams | May 5, 1942 |
| 1,318,657 | Frasch | Oct. 14, 1919 |
| 1,086,452 | Golodetz | Feb. 10, 1914 |
| 1,804,553 | Dubbs | May 12, 1931 |
| 2,070,100 | Twomey | Feb. 9, 1937 |
| 1,759,813 | Gray | May 20, 1930 |
| 1,865,474 | Mandelbaum | July 5, 1932 |

FOREIGN PATENTS

| Number | Country | Date |
|---|---|---|
| 795,827 | France | Jan. 13, 1936 |